United States Patent [19]

Zaruba et al.

[11] Patent Number: 4,692,585
[45] Date of Patent: Sep. 8, 1987

[54] APPARATUS FOR A-C ARC WELDING WITH A CONSUMABLE ELECTRODE

[75] Inventors: Igor I. Zaruba; Vladimir V. Dymenko; Viktor I. Bolotko, all of Kiev, U.S.S.R.

[73] Assignee: Institute Electrosvarki Imeni Patona, Kiev, U.S.S.R.

[21] Appl. No.: 930,550

[22] Filed: Nov. 12, 1986

[51] Int. Cl.⁴ .................................................. B23K 9/06
[52] U.S. Cl. .............................. 219/130.4; 219/137 PS
[58] Field of Search ............ 219/130.4, 137 PS, 130.51

[56] References Cited

U.S. PATENT DOCUMENTS 3,780,258 12/1973 Iceland et al. ..................... 219/130.4

FOREIGN PATENT DOCUMENTS 523769 10/1976 U.S.S.R. .
603521 4/1978 U.S.S.R. .

Primary Examiner—Clifford C. Shaw
Attorney, Agent, or Firm—Lilling & Greenspan

[57] ABSTRACT

An apparatus for a-c welding with a consumable electrode has a welding transformer having a secondary winding connected to an electrode gap and two pulse generators. Each pulse generator has a power circuit connected in parallel with the electrode gap and consisting of a series circuit including a thyristor switch, a power supply winding and a switched capacitor, and a unit for controlling the thyristor switch. Each control unit has a zero detector and a control pulse former, the zero detector of the control unit of the first pulse generator being connected in parallel with the electrode gap, and the zero detector of the control unit of the second pulse generator being connected in parallel with the switched capacitor of the first pulse generator.

1 Claim, 4 Drawing Figures

APPARATUS FOR A-C ARC WELDING WITH A CONSUMABLE ELECTRODE

FIELD OF THE ART

The invention relates to the arc welding, and more specifically, it deals with apparatuses for a-c arc welding with a consumable electrode.

The invention may be used for power-assisted and manual arc welding of steels and their alloys with a consumable electrode.

BACKGROUND OF THE INVENTION

Short-circuit is known to be very likely to occur during a-c welding in the electrode gap at the moment of transition of welding current through zero point since electromagnetic forces associated with the flow of welding current cease to act upon a drop of molten metal of the electrode and upon the bath of molten metal of the workpiece being welded. Thus, the drop will hang down under gravity along the electrode axis, and molten metal of the bath, that has been forced out from under the arc beforehands, is straightened to approach the drop.

Such short-circuits may be the reasons for distruption of welding process (especially during power-assisted welding with mechanical supply of wire electrode) since energy supply from the welding transformer is interrupted in this case, and short-circuit may last longer, the unmelted end face of the electrode being sumberged in the bath and touching its bottom. Immediately after that (when maximum short-circuit current value is achieved), the electrode is burnt. This results in a substantial metal outburst from the bath and, not unfrequently, in a disruption of the arc and interruption of welding process.

Known in the art is an apparatus for a-c arc welding (cf. USSR Inventor's Certificate No. 523769, Cl. B 23 K 9/00, publ. 1976), comprising an arc stabilizer which ensures that one pulse of a switch capacitor discharge passes through the electrode gap every moment the welding current passes through zero point. This pulse is capable of preventing short-circuit from occurring at that moment but it cannot reignite the arc. Therefore, such an apparatus can only stabilize the arc in welding with a non-consumable electrode or with manual arc welding with a consumable electrode when short-circuits in the electrode gap at the moment the welding current passes through zero point would not disrupt welding process. For this reason the apparatus cannot be used for power-assisted welding with mechanical supply of the electrode.

The most similar to the invention is an apparatus for a-c arc welding with a consumable electrode with an arc stabilizing feature (cf. USSR Inventor's Certificate No. 603521, Cl. B 23 K 9/06, publ. 1978).

This apparatus comprises a welding transformer having a secondary winding connected to an electrode gap and a pulse generator having a power circuit connected in parallel with the electrode gap and consisting of a series circuit including a thyristor switch, a power supply winding and a switched capacitor, and a thyristor switch control unit having a zero detector connected in parallel with the electrode gap and a control pulse former.

When welding current passes through zero point (with a respective change in polarity at the electrode gap), the zero detector will respond to this change by forming a signal that goes to the control pulse former which will cause one of the thyristors of the switch to fire. The switched capacitor is thus pulse charged through the electrode gap, and the abovementioned switch thyristor is blocked. During the next halfwave of the welding current, when polarity at the electrode gap changes again, the zero detector will generate a signal fed to the control pulse former which will cause a second thyristor of the switch to fire. The switched capacitor will be pulse recharged through the electrode gap. Therefore, upon every passage of welding current through zero point, one pulse will pass through the electrode gap.

In case of a power-assisted welding with a consumable electrode, this pulse is capable of breaking-down liquid metal bridge between the electrode and workpiece, which is formed upon short-circuit, but it cannot reignite the arc. The arc will be reignited after a necessary voltage in the secondary winding of the welding transformer will have been reached.

SUMMARY OF THE INVENTION

It is an object of the invention to stabilize arc burning.

The invention resides in that in an apparatus for a-c arc welding with a consumable electrode, comprising a welding transformer having a secondary winding connected to the electrode gap and a pulse generator including a power circuit connected in parallel with the electrode gap and consisting of a series circuit including a thyristor switch, a power supply winding and a switched capacitor, and a thyristor switch control unit having a zero detector connected in parallel with the electrode gap and a control pulse former having an input connected to the output of the zero detector and outputs connected to the control inputs of the thyristor switch, according to the invention, also comprises an auxiliary pulse generator having a power circuit connected in parallel with the electrode gap and consisting of a series circuit including a thyristor switch, a power supply winding and a switched capacitor, and a thyristor switch control unit having a zero detector connected in parallel with the switched capacitor of the main pulse generator and a control pulse former having an input connected to the output of the zero detector and outputs connected to the control inputs of the thyristor switch.

The invention makes it possible to carry out a-c welding with arc burning stabilization so as to ensure high quality of welded joints.

BRIEF DESCRIPTION OF THE DRAWINGS

The invention will now be described with reference to the accompanying drawings illustrating a specific embodiment thereof, in which.

DETAILED DESCRIPTION OF THE INVENTION

Figure 1:
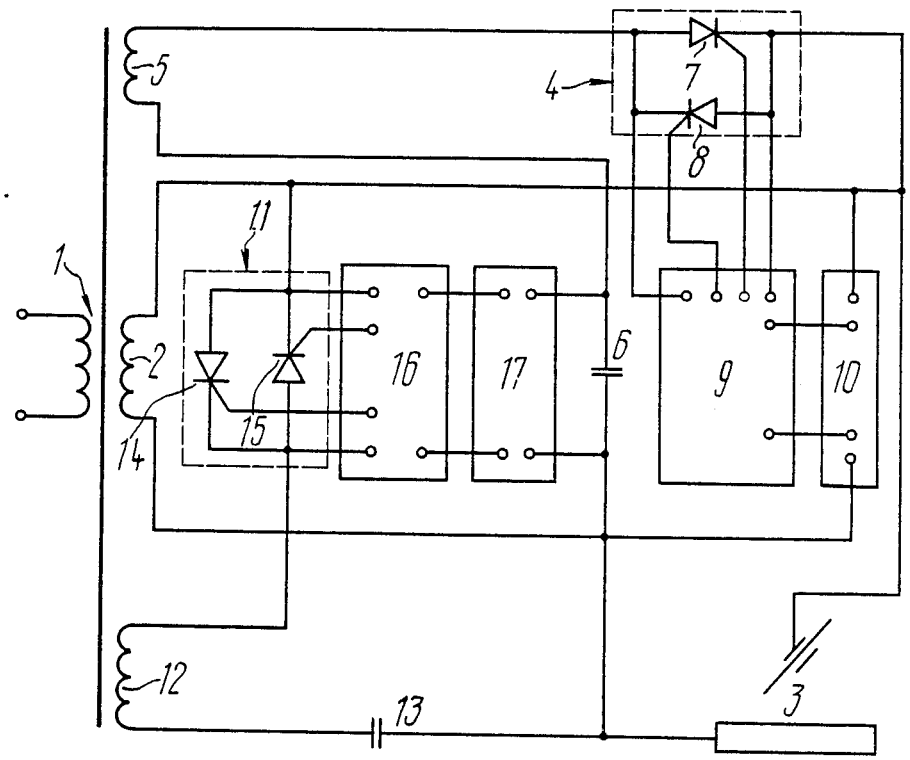
FIG. 1 shows a block-diagram of an apparatus for a-c arc welding with a consumable electrode according to the invention.

According to the invention, an apparatus for a-c arc welding with a consumable electrode comprises a welding transformer 1 (FIG. 1) having a secondary winding 2 connected to an electrode gap 3 and two pulse generators. A first pulse generator comprises a power circuit connected in parallel with the electrode gap 3 and having a series circuit consisting of a thyristor switch 4, a power supply winding 5 and a switched capacitor 6. The thyristor switch 4 consists of thyristors 7 and 8 connected to a control pulse former 9. In addition, the first pulse generator comprises a unit for controlling the thyristor switch 4 consisting of a zero detector 10 connected in parallel with the electrode gap 3 and the control pulse former 9 having its input connected to the zero detector 10.

The second pulse generator consists of a power circuit connected in parallel with the electrode gap 3 and consisting of a series circuit including a thyristor switch 11, a powr supply winding 12 and a switched capacitor 13. The thyristor switch 11 consists of thyristors 14 and 15 connected to a control pulse former 16. In addition, the second pulse generator comprises a unit for controlling the thyristor switch 11 consisting of a zero detector 17 connected in parallel with the switched capacitor 6 and a control pulse former 16 having an input connected to the zero detector 17.

Figure 2:
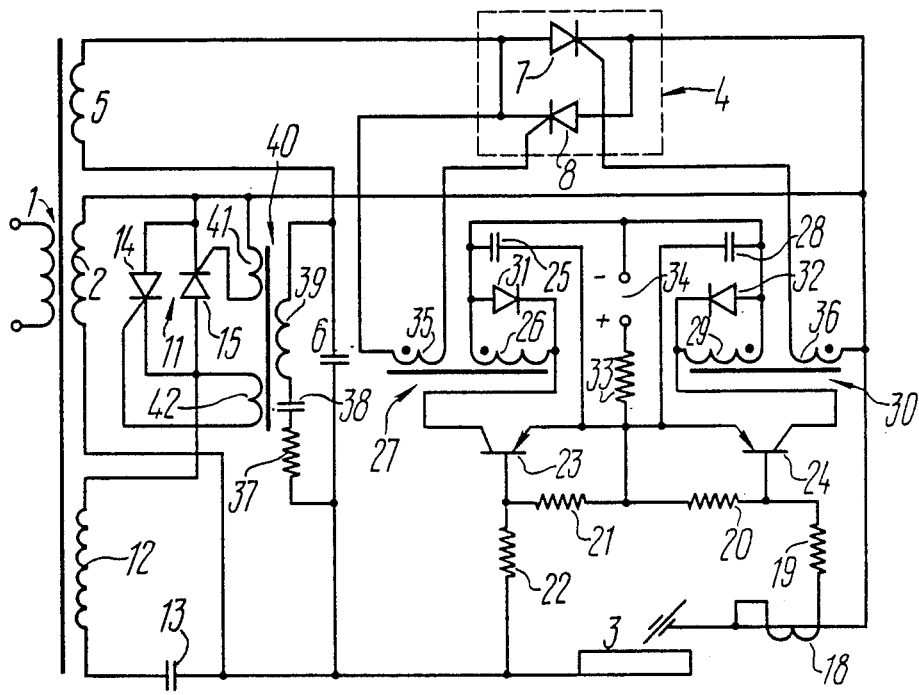
FIG. 2 is a diagram showing one embodiment of an apparatus according to the invention.

The zero detector 10 of the first pulse generator comprises a current transformer 18 (FIG. 2) which is connected to the winding 2 of the welding transformer, and ohmic divider consisting of series-connected resistors 19, 20, 21, 22, and transistors 23, 24 having their bases connected to the ohmic divider. In addition, it also comprises a capacitor 25 connected in series with a primary winding 26 of a transformer 27 and to the emitter of the transistor 23 and a capacitor 28 connected in series with a primary winding 29 of a transformer 30 and to the emitter of the transistor 24. A shunting rectifier 31 is connected in parallel with the winding 26 and a shuniting rectifier 32 is connected in parallel with the winding 29. One lead of a bias resistor 33 is connected to the emitters of the transistors 23 and 24, the other lead of the resistor being connected to the positive terminal of a power supply unit 34 having its negative terminal connected to the leads of the capacitors 25 and 28.

The pulse former 9 of the first pulse generator consists of a secondary winding 35 of the transformer 27 connected to the thyristor 8 and a secondary winding 36 of the transformer 30 connected to the thyristor 7 of the switch 4.

The zero detector 17 (FIG. 1) of the second pulse generator consisting of a series circuit including a resistor 37, a capacitor 38 and a primary winding 39 of a transformer 40 (FIG. 2) is connected in parallel with the switched capacitor 6 of the first pulse generator.

The control pulse former 16 (FIG. 1) consists of a winding 41 (FIG. 2) of the transformer 40 connected to the thyristor 15 of the switch 11 and a winding 42 connected to the thyristor 14 of the switch 11.

Figure 3A:
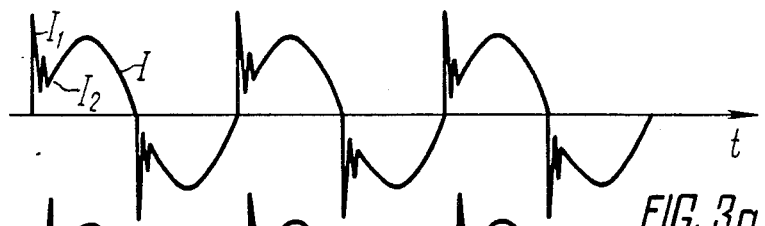
FIGS. 3a and 3b show time-related diagrams illustrating operation of an apparatus according to the invention.
Figure 3B:

FIG. 3 shows time-related diagrams of welding current I and voltage U showing peak values $I_1$ and $I_2$, $U_1$ and $U_2$ of current and voltage stabilizing pulses, respectively.

The apparatus functions in the following manner.

Depending on polarity of voltage at the electrode gap 3 (FIG. 2), the current transformer 18 working under saturation conditions forms pulse signals which will alternately make the transistors 23 and 24 conductive.

Let us consider a case (at the moment the apparatus is switched on) when there is the positive potential at the electrode and the negative potential at the workpiece being welded. The transistor 23 will conduct, and the capacitor 25, which has been charged beforehands from the power supply 34, will discharge through the primary winding 26 of the transformer 27 through a circuit consisting of the capacitor 25, emitter/collector junction of the transistor 23, primary winding 26, capacitor 25. A pulse is formed in the secondary winding 35 of the transformer 27 to cause the thyristor 8 to fire so that the capacitor 6 might be charged at the moment the apparatus is switched on and recharged during next cycles from the power supply winding 5 of the magnetic dispersion transformer 1, through the electrode gap so as to break down bridges forming upon short-circuit.

Parameters of the supply winding 5 and capacitor 6 are chosen in such a manner as to provide for a magnitude of the recharge pulse within the range from 200 to 500 A.

At the next moment, when polarity at the electrode gap 3 changes (the positive charge at the workpiece and negative at the electrode), the transistor 24 becomes conductive, and the capacitor 28, which was preliminary charged from the power supply 34, will discharge through a circuit consisting of the capacitor 28, emitter/collector junction of the transistor 24, primary winding 29 of the transformer 30. A firing pulse for the thyristor 7 is formed in the secondary winding 36 of the transformer 30. The thyristor 7 fires so as to allow the capacitor 6 to be recharged again through the electrode gap 3.

The zero detector 17 (FIG. 1) including the primary winding 39 (FIG. 2) of the transformer 40 of the second pulse generator is connected in parallel with the capacitor 6 at which the voltage is exactly square. Consequently, during recharging of the capacitor 6, pulses for alternating firing of the thyristors 14 and 15 of the switch 11 are formed in the secondary windings 41 and 42 of the transformer 40.

The capacitor 13 will be recharged from the power supply winding 12 of the transformer 1 through the electrode gap 3 to ensure reignition of the arc.

Parameters of the power supply winding 12 and capacitor 13 are chosen in such a manner that the pulse should have an amplitude value of voltage at 200 to 1000 V.

Therefore, the apparatus according to the invention ensures the passage of two pulses through the electrode gap 3 at the moment the welding current passes through zero point. The first pulse at the current amplitude value of 200 to 500 A will break down a molten metal bridge forming upon short-circuit and the second pulse with a voltage amplitude of 200 to 1000 V will reignite the arc.

Thus stability of arc burning and high quality of welding are achieved.

What is claimed is:

1. An apparatus for a-c arc welding with a consumable electrode, comprising;
   a welding transformer, a secondary winding of said welding transformer being connected to an electrode gap;
   a first pulse generator;
   a power circuit of said first pulse generator connected in parallel with said electrode gap and having a series circuit including a thyristor switch having control inputs, a power supply winding, and a switched capacitor;
   a control unit for controlling said thyristor switch of said first pulse generator;

a zero detector of said control unit connected in parallel with said electrode gap, and an output of said zero detector;

a control pulse former of said control unit having an input connected to said output of said zero detector and outputs connected to said control inputs of said thyristor switch;

a second pulse generator;

a power circuit of said second pulse generator connected in parallel with said electrode gap and having a series circuit including a thyristor switch having control inputs, a power supply winding, and a switched capacitor;

a control unit for controlling said thyristor switch of said second pulse generator;

a zero detector of said control unit fo said thyristor switch of said second pulse generator connected in parallel with said switched capacitor of said power circuit of said first pulse generator, and an output of said zero detector;

a control pulse former of said control unit of said thyristor switch of said second pulse generator having an input connected to said output of said zero detector and outputs connected to said control inputs of said thyristor switch of said second pulse generator.

\* \* \* \* \*